(12) United States Patent
Nakamura et al.

(10) Patent No.: US 8,049,965 B2
(45) Date of Patent: Nov. 1, 2011

(54) DISPLAY MEMBER

(75) Inventors: Mitsutoshi Nakamura, Tokyo (JP); Tatsuya Nagase, Tokyo (JP); Motoi Nishimura, Tokyo (JP); Aya Shirai, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 244 days.

(21) Appl. No.: 12/403,910

(22) Filed: Mar. 13, 2009

(65) Prior Publication Data

US 2009/0237800 A1 Sep. 24, 2009

(30) Foreign Application Priority Data

Mar. 18, 2008 (JP) ................... 2008-069700

(51) Int. Cl.
*G02B 13/20* (2006.01)
*G02B 5/02* (2006.01)

(52) U.S. Cl. ........................ 359/599; 359/452
(58) Field of Classification Search .............. 359/599, 359/601–614, 492–493, 452
See application file for complete search history.

(56) References Cited

U.S. PATENT DOCUMENTS

| 5,473,454 A * | 12/1995 | Blanchard ................... 349/112 |
| 5,627,426 A * | 5/1997 | Whitman et al. ............ 313/116 |
| 5,825,542 A * | 10/1998 | Cobb et al. .................... 359/487 |
| 7,582,351 B2 * | 9/2009 | Yokogawa et al. ........... 428/212 |
| 2005/0030630 A1* | 2/2005 | Ohnishi et al. ................ 359/599 |
| 2008/0123192 A1* | 5/2008 | Lin .................................. 359/599 |
| 2009/0145347 A1* | 6/2009 | Nakamura et al. ............ 116/216 |
| 2011/0123754 A1* | 5/2011 | Shirai et al. ................... 428/41.8 |

FOREIGN PATENT DOCUMENTS

JP 2004269922 9/2004
JP 200628202 2/2006

* cited by examiner

*Primary Examiner* — Thong Nguyen
(74) *Attorney, Agent, or Firm* — Lucas & Mercanti, LLP (57) ABSTRACT

Provided is a display member containing: an display layer which exhibits a structural color and contains spherical bodies and a matrix; and a reflective interface which reflects a light transmitting through the display layer, wherein the reflective interface is made between the display layer and a reflective interface forming layer which is provided in contact with the display layer; and a refractive index of the spherical bodies na, a refractive index of the matrix nb and a refractive index of the reflective interface forming layer nc satisfy the following Formulas (1) and (2):

$0.35 < nc/na < 1.00,$  Formula (1)

$0.35 < nc/nb < 1.00.$  Formula (2)

13 Claims, 1 Drawing Sheet

DISPLAY MEMBER

CROSS-REFERENCE TO RELATED APPLICATION

This application is based on Japanese Patent Application No. 2008-069700 filed on Mar. 18, 2008 with Japan Patent Office, the entire content of which is hereby incorporated by reference.

BACKGROUND OF THE INVENTION

1. Technical Field

The present invention relates to a display member which exhibits a structural color.

2. Background

Heretofore, there have been proposed several kinds of display members used for a sensor, a display, a panel, a ravel and a sheet which make use of specific properties of a structural color. Examples thereof include display members containing solid particles arranged in a periodic structure and filled with a gas, a liquid or a solid material between the solid particles. (Refer to Patent documents 1 and 2.)

However, in recent years, there is a demand of a display having a high anisotropy in visibility which permits only the user of the display to observe the display from the viewpoint of security. The display members disclosed in the above-described patent documents have a problem to be visible regardless of the observing directions.

Patent Document 1: Japanese Patent Application Publication (JP-A) No. 2004-269922

Patent Document 1: JP-A No. 2006-28202

SUMMARY

The present invention is achieved in consideration of the above problems. An object of the present invention is to provide a display member provided with a security property.

One of the embodiments of the present invention is a display member comprising:

a display layer which contains spherical bodies and a matrix, and exhibits a structural color; and a reflective interface which reflects a light transmitting through the display layer, wherein the reflective interface is made of a reflective interface forming layer which is provided in contact with the display layer; and a refractive index of the spherical bodies na, a refractive index of the matrix nb and a refractive index of the reflective interface forming layer nc satisfy the following Formulas (1) and (2):

$$0.35 < nc/na < 1.00 \quad \text{Formula (1)}$$

$$0.35 < nc/nb < 1.00. \quad \text{Formula (2)}$$

Another embodiment of the present invention is a display member comprising:

a display layer which contains spherical bodies and a matrix, and exhibits a structural color; and a reflective interface which reflects a light transmitting through the display layer, wherein the reflective interface is made of a reflective interface forming upper layer and a reflective interface forming under layer, provided that the upper layer is nearer to the display layer than the under layer, and the under layer is provided in contact with the upper layer; and a refractive index of the matrix nb, and a refractive index of the reflective interface forming upper layer nc1 and a refractive index of the reflective interface forming under layer nc2 satisfy the following Formulas (3) and (4):

$$nb \leq nc1 \quad \text{Formula (3)}$$

$$0.35 < nc2/nc1 < 1.00. \quad \text{Formula (4)}$$

In a display member of the present invention, the incident light coming from above the display layer is usually selectively reflected at a display layer. The reflected light has a wavelength determined by an angle θ which is determined with respect to a perpendicular line of the display member, which is called as "viewing angle", and exhibits a structural color. This reflected light having a specific wavelength is called as "a display layer selective-reflected light". Due to the display structure in which a specific reflective interface is formed under the display layer, among the lights which transmit though the display layer, a light having a specific wavelength based on the property of the reflective interface, which is called as "an interface reflected light", is selectively reflected. The interface reflected light transmits again through the display layer. The structural color is exhibited by both "a display layer selective-reflected light" and "the interface reflected light".

On the other hand, in the display member of the present invention, when the incident light arriving at the reflective interface becomes fully interface reflected light, which means when the incident light is completely reflected, the observer cannot recognize an exhibition of a structural color.

And, according to the display member of the present invention, the above-described interface reflected light is controlled by the property of the specific reflective interface. As a result, the range of the observable angle which permits exhibition of a structural color is suitably determined. Consequently, the angle dependency, in which the exhibition of the structural color is prohibited for a large viewing angle, is realized resulting in achieving a display member of high security.

DESCRIPTION OF THE PREFERRED EMBODIMENT

The present invention is explained in detail below.

First Embodiment

Figure 1:
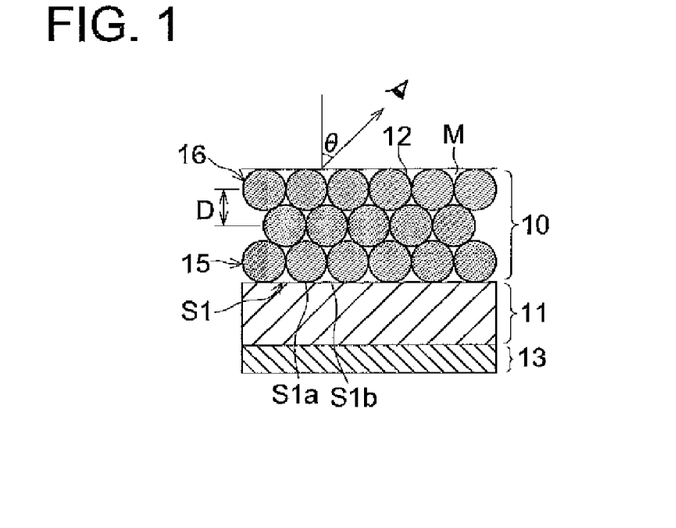
FIG. 1 is an explanatory cross-sectional view illustrating an example of a constitution of a display member of the present invention.

A display member of a first embodiment according to the present invention has a structure as illustrated by FIG. 1. It has a display layer 10 exhibiting a structural color; and a reflective interface S1 produced by the display layer 10 and a reflective interface forming layer 11 which is provided in contact with the display layer 10. The reflective interface S1 reflects the light which transmits through the display layer 10. When a refractive index of the spherical bodies which form the display layer 10 is na, a refractive index of a matrix M which forms the display layer 10 is nb and a refractive index of the reflective interface forming layer 11 is nc, the display member of the present invention satisfies the following Formulas (1) and (2):

$$0.35 < nc/na < 1.00 \quad \text{Formula (1)}$$

$$0.35 < nc/nb < 1.00. \quad \text{Formula (2)}$$

When the display member satisfies the above-described Formulas (1) and (2) a light having an expected wavelength is each respectively selectively reflected at a portion of a contact region S1a which is formed by a spherical body 12 contacting with a reflective interface S1 and a reflective interface forming layer 11, and at a portion of a contact region S1b which is formed by a matrix M contacting with a reflective interface S1 and a reflective interface forming layer 11. As a result, the light having an expected wavelength is selectively reflected at all region of the reflective interface S1.

In such display member, a structural color is exhibited by mixed lights of: (i) an interface reflected light which is selectively reflected at the reflective interface S1; and (ii) a display layer selective-reflected light which is produced by the display layer 10.

And, in this display member, when the viewing angle is larger than an expected value, the interface reflected light selectively reflected at the reflective interface S1 is designed to become all of the light entered in the reflective interface S1. This means the total reflection is realized at the reflective interface S1. As a result, all of the total light entered in the display member is reflected either by the display layer 10 or the reflective interface S1. Namely, due to the fact that all of the light entered in the display member is reflected, exhibition of a structural color is prohibited at a viewing angle larger than an expected value.

In the display member of the present invention, the range of observable angle in which a structural color can be recognized varies depending on the combination of the materials which form each of the spherical bodies 12, the matrix M and the reflective interface forming layer 11. An example of a preferred range of a viewing angle is from 0 to 70°, and another example of a more preferred range is from 0 to 55°. A preferred upper side value of a viewing angle range may be more than 20°.

A particular example of a viewing angle is determined to be from 0 to 52°, when a refractive index of the spherical bodies 12 is 1.56, a refractive index of the matrix M is 1.41, and a refractive index of a reflective interface forming layer 11 is 1.34.

The ratios of the refractive indexes nc/na and nc/na in Formulas (1) and (2) indicate the conditions under which the total reflection is realized at the reflective interface S1. In particular, nc/na is a condition which produces the total reflection at an interface (a contact region S1a) between the spherical bodies 12 and the reflective interface forming layer 11; and nc/nb is a condition which produces the total reflection at an interface (a contact region S1b) between the matrix M and the reflective interface forming layer 11.

When a ratio of a refractive index nc of a reflective interface forming layer 11 to a refractive index na of spherical bodies 12, nc/na (hereafter it is called as "a refractive index ratio at a contact region S1a") is 0.35 or less, and/or a ratio of a refractive index nc of a reflective interface forming layer 11 to a refractive index nb of a matrix M, nc/nb (hereafter it is called as "a refractive index ratio at a contact region S1b") is 0.35 or less, the range of observable angle becomes too small to view to practical use. On the other hand, when the refractive index ratio nc/na at a contact region S1a is 1.00 or more, and/or the refractive index ratio nc/nb at a contact region S1b is 1.00 or more, the incident light entered in the reflective interface S1 cannot totally transmits through the reflective interface forming layer 11 to produce an interface reflected light. As a result, a structural color is exhibited only by a display layer selective-reflected light. In this case, there is no range of angle in which a structural color is not recognized and the obtained display member cannot achieve an expected security property.

[Display Member]

The display layer 10 of the display member is composed of a periodic structure 16 formed in a matrix M. Formation of such a periodic structure in the display layer 10 makes it possible to recognize a chromatic color by irradiation with a light in a visible range.

The display layer 10 has a regularly arranged structure as is shown in FIG. 1 in which spherical bodies 12 made of solid particles are regularly arranged in contact with each other in a matrix M in plane direction so as to form a spherical body layer 15. In the spherical body layer 15, the spherical bodies 12 are regularly arranged to be in a state of contact with each other in a depth direction.

Figure 2:
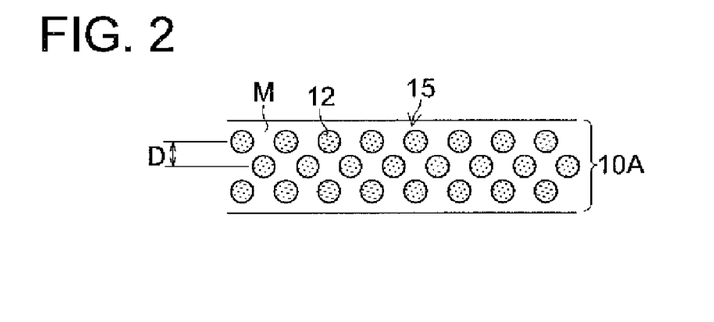
FIG. 2 is an explanatory cross-sectional view illustrating an example of a constitution of a display layer in an display member of the present invention.

Moreover, the display layer may have a regularly arranged structure as is shown in FIG. 2, a display layer 10A. In which, spherical bodies 12 made of solid particles are regularly arranged in non-contact with each other in a matrix M in plane direction to form a spherical body layer 15. And in the spherical body layer 15, the spherical bodies 12 are regularly arranged to be in a state of non-contact with each other in a depth direction.

The spherical body layer 15 has a structure in which the spherical bodies 12 are regularly arranged to be located in one direction with respect to a direction of an incident light. In particular, it is preferable that the spherical body layer 15 will form a closest packed structure with the spherical bodies 12.

In display layer 10 an absolute value of a difference between a refractive index of the spherical bodies 12 and the matrix M (hereafter it is called as "a refractive index difference") is preferably from 0.02 to 2.0, and it is more preferably from 0.1 to 1.6.

When this refractive index difference is less than 0.02, the structural color is hard to be realized. And, when this refractive index difference is more than 0.02, the light scattering will be large and the obtained structural color becomes clouded to yield white turbidity.

[Structural Color]

The structural color obtained by the display member of the present invention is a color exhibited with mixed wavelength lights of an interface reflected light which is selectively reflected at a reflective interface S1 and a display layer selective-reflected light which is produced by a display layer 10.

The display layer selective-reflected light concerned with the display layer 10 is a light represented by the following Scheme (1) based on Bragg's Law and Snell's Law.

$$\lambda = 2nD(\cos\theta) \quad \text{Scheme (1):}$$

In Scheme (1), λ represents a peak wavelength of the structural color, n represents a refractive index of the display layer 10 represented by Scheme (2) below, D represents a distance between the spherical body layers 15, and θ represents a viewing angle to a perpendicular line of the display member.

$$n = \{na \cdot c\} + \{nb \cdot (1-c)\} \quad \text{Scheme (2):}$$

In Scheme (2), na represents a refractive index of the spherical bodies 12, nb represents a refractive index of the matrix M, and c represents a volume fraction of the spherical bodies 12 in the display layer 10.

Here, the peak wavelength of the structural color λ can be measured using MCPD-3700 (made of OTSUKA DENSHI Corporation Ltd.) which allow to confirm the relationship between the light source and the viewing angle by making use of a glass fiber.

The particle layer distance D can be calculated from the measured peak wavelength of the structural color λ by using the above-described Scheme (1).

The thickness of the display layer 10 will varies depending on the purpose of use. An example of the thickness is 0.1 to 100 μm.

A preferable example of the thickness of the spherical body layer 15 is from 0.1 to 100 μm.

When the thickness of the spherical body layer is less than 0.1 μm, the density of the obtained structural color maybe pale. On the other hand, when the thickness of the spherical body layer is more than 100 μm, the light scattering may become so considerable that the structural color will become clouded.

In the display layer 10, the repeating number of the spherical body layer 15 is preferably 1 or more, and more preferably from 5 to 500.

In the case where the repeating number is less than 1, the display layer is not allowed to exhibit the structural color.

In the display member of the present invention, the structural color obtained is not limited to a color having a peak wavelength in the visible range. The color the structural color may have a peak wavelength in the ultra-violet range or in the ultra-red range.

The display member exhibiting a light having a peak wavelength in the ultraviolet range or in the ultra-red range may be used for a sensor incorporated in a detecting apparatus for a ultra-red light or a ultra-violet light.

The particle layer distance D is preferably from 50 to 500 nm. By setting the particle layer distance D in the aforesaid range, the obtained structural color becomes to have a peak wavelength in the near ultra-violet, in the visible range, or in the near ultra-red range. While, when the particle layer distance D is larger than 500 nm, the obtained display layer may not exhibit a structural color.

[Spherical Bodies]

In the present invention, a spherical body is a material that forms a spherical shape in three dimensions. It is not limited to a complete spherical shape but it may be an approximate spherical shape. The material for the spherical body may have a state of solid, liquid or gas as long as the material has a different refractive index from that of a matrix.

The material for producing spherical bodies in the display layer 15 may be suitably selected by considering the materials for producing the matrix M and the reflective interface forming layer 11.

To be more precise, the refractive index na of the spherical bodies is required to be different from the refractive index nb of the matrix M; na is required to satisfy the above-described Formula (1) in relation to the refractive index nc of the reflective interface forming layer; and the material for producing spherical bodies is required to be immiscible with the material for producing the matrix M.

Further, the spherical bodies 12 composing the display layer 10 is preferable to have a high affinity with the material for producing the matrix M.

Various substances can be cited for the spherical bodies 12 which forms the display layer 10.

Specific examples of the substances are organic particles prepared by polymerization of a single polymerizable monomer, or polymerization of two or more kinds of polymerizable monomers, which monomer includes a styrene monomer such as styrene, methyl styrene, methoxy styrene, butyl styrene, phenyl styrene, and chlorostyrene; an acrylic acid ester monomer or a methacrylic acid ester monomer such as methyl acrylate, ethyl acrylate, (iso)propyl acrylate, butyl acrylate, hexyl acrylate, octyl acrylate, ethylhexyl acrylate, methyl methacrylate, ethyl methacrylate, butyl methacrylate, and ethylhexyl methacrylate; a carboxylic acid monomer such as acrylic acid, methacrylic acid, itaconic acid, and fumaric acid.

Further, the organic particles may be polymerized particles comprising a polymerizable monomer in which a crosslinkable monomer is added. The crosslinkable monomers include divinylbenzene, ethylene glycol dimethacrylate, tetraethylene glycol dimethacrylate, and trimethylol propane trimethacrylate.

Other listed examples of the substances are inorganic particles made of inorganic oxide such as silica, titanium oxide, alumina, and copper oxide, and composite oxide; and particles formed from glass, or ceramic.

Further listed examples are core-shell type particles having core particles made of the aforesaid organic particles or inorganic particles each covered with a shell made of a material different from the materials for forming the core particles. The shell layer may be made of metal fine particles, metal oxide fine particles such as titania, metal oxide nano-sheet made of titania.

More listed examples of the substance are hollow type particles which are produced by eliminating the core portion of the aforesaid core-shell particles by applying calcination or extraction for the aforesaid core-shell particles.

Among the aforesaid particles, the organic particles are suitably used for the substances for spherical bodies.

An average particle diameter of the spherical bodies 12 must be set by considering the relationship of a refractive index of the spherical bodies 12 and a refractive index of the matrix M. In addition to that, the spherical bodies 12 are required to form a stable colloid solution when they are dispersed. For that reason, the average particle diameter of the spherical bodies 12 is preferably from 50 to 500 nm.

By controlling the average particle diameter of the spherical bodies 12 to be in the range of the aforesaid range, the dispersion thereof can be a stable colloid solution, and at the same time, the structural color exhibited by the obtained display member will have a peak wavelength in the range of the near ultra-violet, the visible range, or the near ultra-red.

The CV value indicating a particle distribution of the spherical bodies 12 is preferably 20% or less, more preferably 10% or less, and particularly preferably 5% or less.

When the CV value is less than 20%, the spherical body layer composed of the spherical bodies 12 can be regularly arranged in the matrix, and as a result, the display layer exhibiting a structural color can be provided.

An average particle diameter can be obtained employing a scanning electron microscope "JSM-7410" (manufactured by JEOL Ltd.) as follows: (i) to take two photographs of the spherical bodies at a magnification of 50,000 times; (ii) to determine a maximum length by measuring arbitral 100 spherical bodies in each of the two photographs; and (iii) to calculate a number-based average value thereof. The term "the maximum length" refers to the maximum length of lengths between any two points on circumference of each spherical body.

Incidentally, when a picture of the spherical bodies is taken as an aggregation, the maximum length of the primary particles which forms the aggregation is measured.

The CV value is calculated by Formula (CV) below employing the standard deviation of the number-based particle distribution and the above average particle diameter.

$$CV \text{ value } (\%) = ((\text{standard deviation})/(\text{average particle diameter})) \times 100 \quad \text{Formula (CV):}$$

The refractive index of the spherical bodies 12 can be measured using various known method. The refractive index of the spherical bodies 12 according to the present invention is a value obtained by the immersion method.

Examples of a refractive index of the spherical bodies 12 are as follows: polystyrene 1.59, polymethyl methacrylate 1.49, polyester 1.60, fluorine modified polymethyl methacrylate 1.40, polystyrene butadiene copolymer 1.56, polymethyl acrylate 1.48, polybutyl acrylate 1.47, silica 1.45, titanium oxide (anatase type) 2.52, titanium oxide (rutile type) 2.76, copper oxide 2.71, aluminium oxide 1.76, barium sulfate 1.64 and ferric oxide 3.08.

The spherical bodies 12 which form the spherical body layer 15 may be an element composed of a single composition, or may be a compound. Further, the aforesaid spherical bodies may be a particle on which surface a substance, by which the spherical bodies are allowed to adhere to each other, is adhered, or may be a particle within which a substance, by which particles are allowed to adhere to each other, is introduced. By employing such an adhesive, particles are allowed to adhere to each other, even if the spherical bodies are made of materials which are hard to self-arrange during formation of the spherical body layer 15. Further, in the case where the spherical bodies are formed employing materials exhibiting a high refractive index, a material exhibiting a low refractive index may be added internally.

The spherical bodies 12 which form the spherical body layer 15 have preferably a high degree of mono-dispersibility so as to easily achieve a regular arrangement during formation of the spherical body layer 15.

To obtain spherical bodies exhibiting high mono-dispersibility, in the case where the spherical bodies are composed of organic materials, the aforesaid spherical bodies are preferably prepared via generally commonly used polymerization methods such as soap-free emulsion polymerization, suspension polymerization, and emulsion polymerization.

The spherical bodies 12 may be subjected to various surface treatments to make the particles exhibit a high affinity to matrix M.

[Matrix]

A material for matrix M which forms the display layer 15 may be suitably selected by considering the materials for the spherical bodies 12 and the reflective interface forming layer 11.

To be more precise, the refractive index nb of the matrix M is required to be different from the refractive index na of the spherical bodies 12; nb is required to satisfy the above-described Formula (2) in relation to the refractive index nc of the reflective interface forming layer; and the material for producing the matrix M is required to be immiscible with the material for producing the spherical bodies 12.

Further, the material for forming matrix M is preferable to have a high affinity with the spherical bodies 12.

Examples of the material for forming the matrix M are: a resin which is soluble in an organic solvent; a water-soluble resin; a hydrogel; an oilgel; a photo-curable agent; a thermo-curable agent; and a moisture-curable agent.

Specific resins which are soluble in an organic solvent include a polystyrene resin, an acrylic resin, and a polyester resin. Water-soluble resins include a polyacrylic acid, a polyvinyl alcohol, and a polyvinyl chloride.

The refractive index of the matrix M can be determined by various commonly known methods, but the refractive index of the matrix M of the present invention is determined such that a thin film comprising only the matrix M is separately prepared and the thin film is measured using an Abbe Refractometer.

Specific refractive indexes are, for example, 1.53 for gelatin/acacia gum, 1.51 for polyvinyl alcohol, 1.51 for sodium polyacrylate, 1.34 for fluorine modified acrylic resin, 1.51 for N-isopropyl amide, and 1.43 for foamed acrylic resin.

[Preparation Method of Display Layer]

Such display layer 10 can be prepared via a method, for example, in which an aqueous dispersion of the spherical bodies 12, and the dispersion is applied on a surface of a surface of a substrate to allow the spherical bodies to be self-arranged to form a periodic structure 16; the formed periodic structure 16 is dried; a solution which forms a matrix M is applied on the dried periodic structure 16 so as to fill the solution between the spherical bodies 12 then dried to be solidified; then the dried periodic structure 16 is peeled off to obtain the display layer 10.

Examples of the methods used for coating the aqueous dispersion of the spherical bodies 12 are such as a screen coating, a dip coating, a spin coating, a curtain coating, and a LB (Langauir-Blodgett) film forming method.

[Reflective Interface Forming Layer]

The material of the reflective interface forming layer 11 constituting the display member of the present invention is suitable selected by considering the materials for the spherical bodies 12 and the matrix M.

To be more precise, the refractive index nc is required to satisfy the above-described Formula (1) in relation to the refractive index na of the spherical bodies 12, and also nc is requited to satisfy the above-described Formula (2) in relation to the refractive index of the matrix M.

Specific materials for forming the reflective interface forming layer 11 are, for example, a fluorinated resin, a fluorinated gel, a silicone resin, and a silicone gel.

It may be possible to employ the reflective interface forming layer 11 which is prepared by forming a hermetic sectional space by using a cell or a spacer, and then filling the space with air or a gas such as helium.

The thickness of the reflective interface forming layer 11 may be, for example, from 5 nm to 1 mm. When the thickness of the reflective interface forming layer 11 is 5 nm or more, the reflective interface forming layer 11 may be hard to be peeled off or deformed during the preparation of the display layer 10. As a consequence, total reflection at a reflective interface S1 of the obtained display member may be easily realized. On the other hand, when the thickness of the reflective interface forming layer 11 is 1 mm or less, the color of the structural color exhibited by the obtained display member may be deep.

The refractive index of the reflective interface forming layer 11 can be determined by various commonly known methods, but the refractive index of the reflective interface forming layer 11 of the present invention is determined such that a thin film comprising only the reflective interface forming layer is separately prepared and the thin film is measured using an refractometer.

[Display Member]

The aforesaid display member may be, for example, as is shown in FIG. 1, constructed as a sheet which is prepared by laminating a reflective interface forming layer 11 and a display layer on a substrate 13.

The usable substrate 13 includes glass, ceramics, and a film or a sheet of materials such as polyethylene terephthalate (PET) and polyethylene naphthalate (PEN). The usable substrate 13 may be black, gray or may have a required color according to need.

In the case where the display layer 10 is prepared using with the aqueous dispersion of the spherical bodies 12, the substrate 13 is preferably the one having a relatively low contact angle on the surface against water. In addition to that, the substrate 13 is preferably the one having a high flatness. For these reasons, the substrate 13 may be subjected to a suitable surface treatment, and it may be subjected to a blast finishing treatment so as to obtain a condition in which the spherical bodies can be easily adhered to the surface.

The display member may be provided with a surface cover layer by the intervention of an adhesive layer on a display layer 10. The display layer 10 is laminated on a reflective interface forming layer 11 provided on a substrate 13.

In such a display member, the substrate 13, the adhesive layer or the surface cover layer is provided when it is needed for a required use. Moreover, the display member may have a structure to be provided with an adhesive layer for a ravel on the rear surface of the substrate 13 or the rear surface of the reflective interface forming layer 11.

In the case where the surface cover layer is provided, the surface cover layer may be a film made of polyethylene terephthalate (PET) and polyethylene naphthalate (PEN), a UV curable resin, all of which exhibit high transparency and do not prevent exhibition of a structural color in the display layer 10.

In the case where the display member is used as a ravel, examples of the adhesives agent used for the adhesive layer for a ravel include an acrylic adhesive and an acrylic-olefin copolymer adhesive.

[Preparation Method of Display Member]

The display member of the present invention can be obtained, for example, by laminating a display layer 10 and a reflective interface forming layer 11 in contact with each other.

In the aforesaid display member, the incident light entering from above the display layer 10 is, generally, selectively reflected at a display layer 10 to become a display layer selective-reflected light resulting in exhibiting a structural color. The display member of the present invention is provided with a specific reflective interface S1 under the display layer 10. Therefore, among the light transmitted through the display layer 10, the interface reflected light is selectively reflected and the interface reflected light passes again through the display layer 10. Consequently, the structural color will be produced by the combined lights of the display layer selective-reflected light and the interface reflected light.

Meanwhile, in the display member of the present invention, when all of the incident light entered in the specific reflective interface S1 becomes the display layer selective-reflected light, that means, when all of the incident light entered in the display member is totally reflected, the observer cannot visually confirm the exhibition of the structural color.

And, in this display member, the aforesaid interface reflected light is controlled by the specific property of the aforesaid specific reflective interface S1. As a result, the range of observable angle which allows the observer to observe the exhibited structural color is suitably determined. Consequently, the angle dependency, in which the exhibition of the structural color is prohibited for a large viewing angle, is realized resulting in achieving a display member of high security.

Second Embodiment

Figure 3:
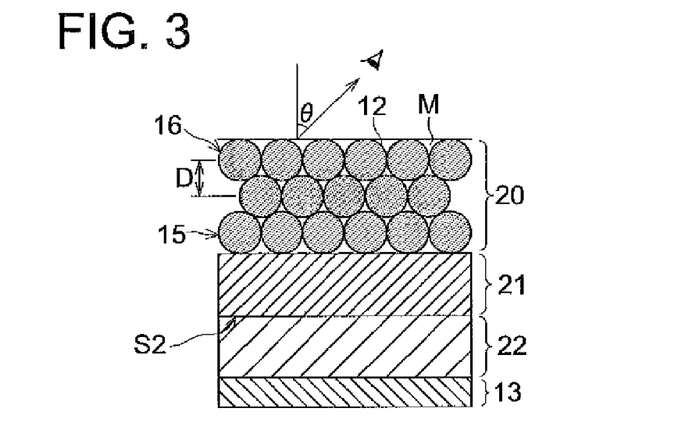
FIG. 3 is an explanatory cross-sectional view illustrating another example of a constitution of a display member of the present invention.

The display member of the second embodiment of the present invention has the same structure as the display member of the second embodiment, except that the second embodiment uses a display layer 20, a reflective interface forming upper layer 21 and a reflective interface forming under layer 22 instead of the display layer 10 and the reflective interface forming layer 11 of the first embodiment of the present invention.

In particular, the display member of the second embodiment has, as is shown in FIG. 3, a display layer 20 which exhibits a structural color and a reflective interface S2 which reflects the light passing through the aforesaid display layer 20. The reflective interface S2 is composed of a reflective interface forming upper layer 21 and a reflective interface forming under layer 22, and the under layer is provided in contact with the upper layer. When a refractive index of the matrix is nb, a refractive index of the reflective interface forming upper layer is nc1, and a refractive index of the reflective interface forming under layer is nc2, nb, nc1 and nc2 satisfy the following Formulas (3) and (4):

$$nb \leqq nc1 \quad \text{Formula (3)}$$

$$0.35 < nc2/nc1 < 1.00. \quad \text{Formula (4)}$$

A light having an expected wavelength is selectively reflected at the reflective interface S2 when the aforesaid Formulas (3) and (4) are satisfied by the display member.

In such display member, a structural color is exhibited by mixed lights of: (i) an interface reflected light which is selectively reflected at the reflective interface S2; and (ii) a display layer selective-reflected light which is produced by the display layer 20.

And, in this display member, when the viewing angle is larger than an expected value, the interface reflected light selectively reflected at the reflective interface S2 is designed to become all of the light entered in the reflective interface S2. This means the total reflection is realized at the reflective interface S2. As a result, all of the incident light entered in the display member is reflected by either the display layer 20 or the reflective interface S2. Namely, due to the fact that all of the incident light entered in the display member is reflected, exhibition of a structural color is prohibited at a viewing angle larger than an expected value.

In the display member of the present invention, the range of observable angle in which a structural color can be recognized varies depending on the combination of the materials which form each of the matrix M, the reflective interface forming upper layer 21 and the reflective interface forming under layer 22. An example of a preferred range of a viewing angle is from 0 to 70°, and another example of more preferred range is from 0 to 55°.

An example of a range of viewing angle is as follows.

When a refractive index of a material composing a matrix M is 1.51, a refractive index of a material composing a reflective interface forming upper layer 21 is 1.51, a refractive index of a material composing a reflective interface forming under layer 22 is 1.34, the range of viewing angle is determined as 0 to 38 degree.

The ratio of the refractive indexes nc2/nc1 in the aforesaid Formula (4) indicates the conditions under which the total reflection is realized at the interface (the reflective interface S2) between the reflective interface forming upper layer 21 and a reflective interface forming under layer 22.

When a ratio of a refractive index nc2 of the reflective interface forming under layer 22 to a refractive index nc1 of the reflective interface forming upper layer 21, nc2/nc1 (hereafter it is called as "a refractive index ratio at a reflective interface S2") is 0.35 or less, the range of observable angle becomes too small to view to practical use. On the other hand, when the refractive index ratio nc2/nc1 is larger than 1.00, the incident light entered in the reflective interface S2 will totally transmits through the reflective interface forming upper layer 21 and the reflective interface forming under layer 22 resulting in failing to produce an interface reflected light. Consequently, the angle dependency for the exhibition of the structural color cannot be achieved.

The display layer 20 of the second embodiment can have the same constitution as the display layer of the first embodiment, except that the spherical bodies 12 is suitably selected by considering the material of the matrix M, and the material of the matrix M is suitably selected by considering the material of the reflective interface forming upper layer 21. The substrate 13 of the second embodiment can have the same constitution as that of the first embodiment.

[Reflective Interface Forming Upper Layer]

The material for forming the reflective interface forming upper layer 21 constituting the display member of the present invention can be suitably selected from light transmissive materials by considering the relationship with materials for the matrix M and the reflective interface forming under layer 22.

In particular, the refractive index nc1 of material is required to satisfies the aforesaid Formula (3) with respect to the relationship with the refractive index nb of the matrix M, and nc1 is also required to satisfy satisfies the aforesaid Formula (4) with respect to the relationship with the refractive index nc2 of the reflective interface forming under layer 22.

Listed examples of the materials for forming the reflective interface forming upper layer 21 include a high refractive glass and polymethyl methacrylate (PMMA) containing $Fe_3O_2$.

The thickness of the reflective interface forming upper layer 21 may be, for example, from 5 nm to 1 mm. When the thickness of the reflective interface forming upper layer 21 is 5 nm or more, the reflective interface forming upper layer 21 may be hard to be peeled off or deformed during the preparation of the display layer 20. As a consequence, total reflection at a reflective interface S2 of the obtained display member may be easy to realize. On the other hand, when the thickness of the reflective interface forming upper layer 21 is 1 mm or less, the color density of the structural color exhibited by the obtained display member may be obtained enough.

[Reflective Interface Forming Under Layer]

The material of the reflective interface forming under layer 22 constituting the display member of the present invention is suitable selected by considering the materials for the material of the reflective interface forming upper layer 21.

To be more precise, the refractive index nc2 is required to satisfy the above described Formula (4) in relation to the refractive index nc1 of the reflective interface forming upper layer 21.

Specific materials for forming the reflective interface forming under layer 22 are, for example, a fluorinated resin, a fluorinated gel, a silicone resin, and a silicone gel.

It may be possible to employ the reflective interface forming under layer 22 which is prepared by forming a hermetic sectional space by using a cell or a spacer, and then filling the space with air or a gas such as helium.

The thickness of the reflective interface forming under layer 22 may be, for example, from 5 nm to 1 mm. When the thickness of the reflective interface forming under layer 22 is 5 nm or more, the reflective interface forming under layer 22 may not be peeled off or may not be deformed during the preparation of the display layer 20. As a consequence, total reflection at a reflective interface S2 of the obtained display member may be easily realized. On the other hand, when the thickness of the reflective interface forming under layer 22 is 1 mm or less, the color of the structural color exhibited by the obtained display member may be deep.

The refractive indexes of the reflective interface forming upper layer 21 and the reflective interface forming under layer 22 can be determined by various commonly known methods. But the refractive indexes of the refractive indexes of the reflective interface forming upper layer 21 and the reflective interface forming under layer 22 each are determined such that thin films each comprising only the reflective interface forming upper layer or the reflective interface forming under layer are separately prepared and each of the thin films is measured using an Abbe Refractometer.

The similar effects obtained by using the display member of the first embodiment can be obtained by the aforesaid display member.

In the aforesaid display member, the incident light entering from above the display layer 20 is, generally, selectively reflected at a display layer 20 to become a display layer selective-reflected light resulting in exhibiting a structural color. The display member of the present invention is provided with a specific reflective interface S2 under the display layer 20 and the reflective interface forming upper layer 21. Therefore, among the light transmitted through the display layer 20 and the reflective interface forming upper layer 21, the interface reflected light is selectively reflected and the interface reflected light passes again through the display layer 20 and the reflective interface forming upper layer 21. Consequently, the structural color will be produced by the combined lights of the display layer selective-reflected light and the interface reflected light.

Meanwhile, in the display member of the present invention, when all of the incident light entered in the specific reflective interface S2 becomes the display layer selective-reflected light, that means, when all of the incident light entered in the display member is totally reflected, the observer cannot visually confirm the exhibition of the structural color.

And, in this display member, the aforesaid interface reflected light is controlled by the specific property of the aforesaid specific reflective interface S2. As a result, the range of observable angle which allows the observer to observe the exhibited structural color is suitably determined. Consequently, the angle dependency, in which the exhibition of the structural color is prohibited for a large viewing angle, is realized resulting in achieving a display member of high security.

In the foregoing embodiments, the present invention was specifically described, but the embodiments of the present invention are not limited to the above, and the embodiments can be variously modified.

EXAMPLES

The present invention is described below with reference to examples, but the present invention is not limited to them. In the followings, the measurement of an average particle diameter, a CV value and a refractive index are carried out as described above.

[Preparation of Spherical Body Dispersion 1]

71 parts by mass of styrene (St), 20 parts by mass of n-butyl acrylate (BA) and 9 parts by mass of methacrylic acid (MAA) were heated at 80° C. to obtain a mixed solution of monomers. The surfactant solution, in which 0.4 parts by mass of sodium dodecyl sulfonate was dissolved into 263 parts by mass of distilled water, was heated to 80° C., which surfactant solution was then blended with the above mixed solution of monomers. After that, the resulting mixture was subjected to a dispersion treatment for 30 minutes via a mechanical dispersion apparatus "CLEARMIX" (produced by M Technique Co., Ltd.) to prepare an emulsified dispersion.

Into a reaction vessel equipped with a mixer, a heating and cooling apparatus, a nitrogen charging apparatus, and a material—additive introducing apparatus, the above-described emulsified dispersion and a surfactant solution which was prepared by dissolving 0.09 parts by mass of sodium dodecyl sulfonate into 142 parts by mass of distilled water, was introduced, and the temperature of the solution was raised to 80° C. while stirring at a stirring rate of 200 rpm in a nitrogen gas stream atmosphere. Into the above solution, 1.4 parts by mass of potassium persulfate, and 54 parts by mass of water were introduced, and the resulting solution was subjected to polymerization treatment for 3 hours. A dispersion of spherical bodies was produced by the above polymerization reaction. Then the dispersion of spherical bodies was loaded to a centrifuge so as to eliminate large sized particles and small sized particles. A dispersion of spherical bodies containing spherical bodies having a high mono-dispersibility [1] was produced by this procedure (hereafter, it is called as "a spherical body dispersion"). The spherical bodies [1] in the spherical body dispersion [1] have an average particle diameter of 280 nm, a CV value of 2.8 and a refractive index of 1.56.

[Preparation of Spherical Body Dispersion 2]

A mixed solution was prepared with 4.7 parts by mass of methanol, 12.6 parts by mass of pure water and 3.0 parts by mass of ammonia. The prepared mixed solution was introduced into a reaction vessel equipped with a mixer and a material—additive introducing apparatus, then 22.8 parts by mass of silicone methoxide was dropwise added while stirring the mixture at 20° C. and hydrolysis reaction was carried out. By this procedure, a spherical body dispersion [2] containing spherical bodies having a high mono-dispersibility was produced. The spherical bodies [2] in the spherical body dispersion [2] have an average particle diameter of 240 nm, a CV value of 5.2 and a refractive index of 1.45.

[Preparation of Spherical Body Dispersion 3]

A mixture of 90 parts by mass of toluene, 10 parts by mass of polymethacrylic acid (PMAA) and 9.0 parts by mass of $Fe_2O_3$ was subjected to a dispersion treatment for 30 minutes via a mechanical dispersion apparatus "CLEARMIX" (produced by M Technique Co., Ltd.) to prepare a dispersion of PMMA/$Fe_2O_3$. This dispersion was mixed with a surfactant solution which was prepared by dissolving 0.4 parts by mass of sodium dodecyl sulfonate into 400 parts by mass of distilled water. Then, the resulting mixture was subjected to a dispersion treatment for 30 minutes via a mechanical dispersion apparatus "CLEARMIX" (produced by M Technique Co., Ltd.) to prepare an emulsified dispersion. The obtained emulsified dispersion was heated at 60° C. at a reduced pressure to evaporate toluene resulting in a dispersion of minute spherical particles made of a PMMA resin in which $Fe_2O_3$ is dispersed. Thus obtained dispersion minute spherical particles were loaded to a centrifuge so as to eliminate large sized particles and small sized particles. A spherical body dispersion [3] containing spherical bodies [3] having a high mono-dispersibility was produced by this procedure. The spherical bodies [3] in the spherical body dispersion [3] have an average particle diameter of 150 nm, a CV value of 8.4 and a refractive index of 2.87.

[Preparation of Spherical Body Dispersion 4]

20 parts by mass of titanium oxide prepared by a titanium alkoxide method (of rutile type, having an average particle diameter: 150 nm, a CV value: 8.4 and a refractive index: 2.76) was dispersed in a surfactant solution which was prepared by dissolving 0.02 parts by mass of sodium dodecyl sulfonate into 100 parts by mass of ion-exchanged water. By this procedure, a spherical body dispersion [4] containing spherical bodies [4] was produced.

Example 1

Preparation of Display Member [1]

The spherical body dispersion [1] thus prepared was applied using a bar coating method on a cleaned glass plate and then dried to obtain a periodic structure having a thickness of 20 μm. Then a silicone gel coating solution was applied on the periodic structure and the coating solution was impregnate between the spherical bodies. Then, the impregnated solution was heated at 60° C. for 1 hour so as to solidify the impregnated solution resulting in forming a display layer [1]. The formed display layer [1] was peeled from the glass plate. The refractive index of the matrix of the silicone gel is shown in Table 1.

On the other hand, a fluorinated gel coating solution was applied on a black colored polyethylene terephthalate (PET) film and the applied gel coating solution was heated 60° C. for 1 hour resulting in forming a fluorinated gel film having a thickness of 10 μm. The refractive index of the reflective interface forming layer composed of the fluorinated gel layer is shown in Table 1.

A display member [1] in sheet form was prepared by laminating the display layer [1] on the fluorinated gel layer.

The prepared display member [1] was visually observed from the front direction perpendicular to the display member [1] (the viewing angle θ=0, which is determined as an angle of viewing direction with respect to a perpendicular line of the display layer). The color of the exhibited structural color was red.

(Evaluation of the Visibility for the Structural Color)

The prepared display member [1] was visually observed by increasing the viewing angle θ by 1 degree at a time. It was confirmed that the exhibition of the structural color was observed at a viewing angle θ of from 0 to 52 degree. It was confirmed that only a black color was observed at a viewing angle θ of from 53 to 90 degree. These results are shown in Table 2. These results show that the display member [1] has an angle dependency by which the exhibition of the structural color was prevented depending on a viewing angle.

Example 2

Preparation of Display Member [2]

A fluorinated gel coating solution was applied on a black colored polyethylene terephthalate (PET) film to obtain a coating layer of the fluorinated gel coating solution. A cleaned glass plate was laminated on the coating layer of the fluorinated gel coating solution, then the spherical body dispersion [2] was applied using a bar coating method on the cleaned glass plate and then dried to obtain a periodic structure having a thickness of 20 μm. Then an aqueous solution containing 20 weight % of polyvinylalcohol was coated on the periodic structure to impregnate the aqueous solution between the spherical bodies. Then, the impregnated solution was heated at 110° C. for 1 hour so as to solidify the impregnated solution resulting in forming a display layer [2]. Further, a transparent PET film having a thickness of 5 μm was adhered to display layer [2] so as to prepare a display member [2] in sheet form. The refractive index of the matrix of polyvinyl alcohol is shown in Table 1. The refractive index of the reflective interface forming upper layer made of glass and the reflective interface forming under layer made of the fluorinated resin coated layer are shown in Table 1.

The prepared display member [2] was visually observed from the front direction perpendicular to the display member [2] (the viewing angle θ=0, which is determined as an angle of viewing direction with respect to a perpendicular line of the display layer). The color of the exhibited structural color was yellow.

(Evaluation of the Visibility for the Structural Color)

The prepared display member [2] was visually observed by increasing the viewing angle θ by 1 degree at a time. It was confirmed that the exhibition of the structural color was observed at a viewing angle θ of from 0 to 38 degree. It was confirmed that only a black color was observed at a viewing angle θ of from 39 to 90 degree. These results are shown in Table 2.

These results show that the display member [2] has an angle dependency by which the exhibition of the structural color was prevented depending on a viewing angle.

Example 3

Preparation of Display Member (3)

An ethanol dispersion containing 1 weight % of PMMA particles having a high mono-dispersibility and having an average particle diameter of 2 µm was sprayed on a black colored polyethylene terephthalate (PET) film to adhere the PMMA particles. Then, a cleaned glass plate having a high refractive index was laminated on the PET film so as to form an air layer between the PET film and the high refractive glass plate. Then, the spherical body dispersion [3] was applied using a bar coating method on the high refractive glass plate and was dried to obtain a periodic structure having a thickness of 20 µm. Then a toluene solution containing 20 weight % of polyester and titanium oxide (the amount of which is 20 weight % based on the weight of the polyester) was coated on the periodic structure to impregnate the toluene solution between the spherical bodies. Then, the impregnated solution was heated at 60° C. for 1 hour to eliminate toluene and to solidify the impregnated solution resulting in forming a display layer [3]. Further, a UV curable resin solution was coated on the display layer [3] and irradiated with a UV lamp for 30 seconds to obtain a protective layer. By this procedure, a display member in sheet form was prepared. The refractive index of the matrix of polyester containing titanium oxide is shown in Table 1. The refractive index of the reflective interface forming upper layer made of made of the high refractive glass and the reflective interface forming under layer made of the air layer are shown in Table 1.

The prepared display member [3] was visually observed from the front direction perpendicular to the display member [3] (the viewing angle θ=0, which is determined as an angle of viewing direction with respect to a perpendicular line of the display layer). The color of the exhibited structural color was red.

(Evaluation of the Visibility for the Structural Color)

The prepared display member [3] was visually observed by increasing the viewing angle θ by 1 degree at a time. It was confirmed that the exhibition of the structural color was observed at a viewing angle θ of from 0 to 21 degree. It was confirmed that only a black color was observed at a viewing angle θ of from 22 to 90 degree. These results are shown in Table 2.

These results show that the display member [3] has an angle dependency by which the exhibition of the structural color was prevented depending on a viewing angle.

Example 4

Preparation of Display Member [4]

A fluorinated resin solution was applied on a black colored polyethylene terephthalate (PET) film and was heated at 10° C. for 30 minutes to solidify the coated solution resulting in forming a fluorinated resin layer. A toluene dispersion containing 5.5 weight % of PMMA and $Fe_3O_2$ (the amount of which is 1000 weight % based on the weight of PMMA) was coated on the fluorinated resin layer and was dried resulting in a $Fe_3O_2$/PMMA layer having a thickness of 5 µm. Then, the spherical body dispersion [4] was applied using a bar coating method on the $Fe_3O_2$/PMMA-layer and was dried to obtain a periodic structure having a thickness of 20 µm. Further, a polyester resin powder was applied on the periodic structure and was heated at 100° C. for 30 minutes so as to impregnate between the spherical bodies and then was solidified resulting in forming the display layer [4]. Further, a transparent PET film having a thickness of 5 µm was adhered to display layer [4] so as to prepare a display member [4] in sheet form. The refractive index of the matrix made of the polyester powder is shown in Table 1. The refractive index of the reflective interface forming upper layer made of the $Fe_3O_2$/PMMA layer and the reflective interface forming under layer made of the fluorinated resin layer are shown in Table 1.

The prepared display member [4] was visually observed from the front direction perpendicular to the display member [4] (the viewing angle θ=0, which is determined as an angle of viewing direction with respect to a perpendicular line of the display layer). The color of the exhibited structural color was yellow.

(Evaluation of the Visibility for the Structural Color)

The prepared display member [4] was visually observed by increasing the viewing angle θ by 1 degree at a time. It was confirmed that the exhibition of the structural color was observed at a viewing angle θ of from 0 to 26 degree. It was confirmed that only a black color was observed at a viewing angle θ of from 27 to 90 degree. These results are shown in Table 2.

These results show that the display member [3] has an angle dependency by which the exhibition of the structural color was prevented depending on a viewing angle.

Comparative Example 1

Preparation of Display Member [5]

A display member [5] in sheet form was prepared in the same manner as preparation method for the display member [1] in Example 1 except that the fluorinated gel layer (reflective interface forming layer) was not provided for the display member [5].

The prepared display member [5] was visually observed from the front direction perpendicular to the display member [5] (the viewing angle θ=0, which is determined as an angle of viewing direction with respect to a perpendicular line of the display layer). The color of the exhibited structural color was red.

(Evaluation of the Visibility for the Structural Color)

The prepared display member [5] was visually observed by increasing the viewing angle θ by 1 degree at a time. It was confirmed that the exhibition of the structural color was observed at a viewing angle θ of from 0 to 90 degree. The result is shown in Table 2.

This result shows that the comparative display member [5] exhibits a structural color regardless of the viewing angle.

Comparative Example 2

Preparation of Display Member [6]

A display member [6] in sheet form was prepared in the same manner as preparation method for the display member [2] in Example 2 except that the reflective interface forming under layer made of the fluorinated resin coated layer was not provided for the display member [6].

The prepared display member [6] was visually observed from the front direction perpendicular to the display member [6] (the viewing angle θ=0, which is determined as an angle of viewing direction with respect to a perpendicular line of the display layer). The color of the exhibited structural color was yellow.
(Evaluation of the Visibility for the Structural Color)

The prepared display member [6] was visually observed by increasing the viewing angle θ by 1 degree at a time. It was confirmed that the exhibition of the structural color was observed at a viewing angle θ of from 0 to 90 degree. The result is shown in Table 2.

This result shows that the comparative display member [6] exhibits a structural color regardless of the viewing angle.

Comparative Example 3

Preparation of Display Member [7]

A display member [7] in sheet form was prepared in the same manner as preparation method for the display member [1] in Example 1 except that a polyester resin was used instead of the fluorinated gel layer.

The prepared display member [7] was visually observed from the front direction perpendicular to the display member [5] (the viewing angle θ=0, which is determined as an angle of viewing direction with respect to a perpendicular line of the display layer). The color of the exhibited structural color was green.
(Evaluation of the Visibility for the Structural Color)

The prepared display member [7] was visually observed by increasing the viewing angle θ by 1 degree at a time. It was confirmed that the exhibition of the structural color was observed at a viewing angle θ of from 0 to 90 degree. The result is shown in Table 2.

This result shows that the comparative display member [7] exhibits a structural color regardless of the viewing angle.

Comparative Example 4

Preparation of Display Member [8]

A display member [8] in sheet form was prepared in the same manner as preparation method for the display member [3] in Example 3 except that a PMMA plate containing arsenic selenide was used instead of the high refractive glass.

The prepared display member [8] was visually observed from the front direction perpendicular to the display member [8] (the viewing angle θ=0, which is determined as an angle of viewing direction with respect to a perpendicular line of the display layer). The color of the exhibited structural color was red.
(Evaluation of the Visibility for the Structural Color)

The prepared display member [8] was visually observed by increasing the viewing angle θ by 1 degree at a time. It was confirmed that the exhibition of the structural color was observed at a viewing angle θ of from 0 to 16 degree. It was confirmed that only a black color was observed at a viewing angle θ of from 17 to 90 degree. The result is shown in Table 2.

This result shows that the comparative display member [8] exhibits a structural color regardless of the viewing angle.

TABLE 1

| | | Spherical bodies | | Matrix | | | | Reflective Interface Forming Layer | | Reflective Interface Forming Upper Layer | | Reflective Interface Forming Under Layer | | | | |
|---|---|---|---|---|---|---|---|---|---|---|---|---|---|---|---|---|
| | Embodiment | Kind | $n_a$ | Kind | $n_b$ | Kind | $n_c$ | Kind | $n_{c1}$ | Kind | $n_{c2}$ | $n_c/n_a$ | $n_c/n_b$ | $n_{c2}/n_{c1}$ |
| ** | 1 | First | PSt/BA/MAA | 1.56 | *1 | 1.41 | *2 | 1.34 | — | | — | — | — | 0.859 | 0.950 | — |
| | 2 | Second | $SiO_2$ | 1.45 | PVA | 1.51 | — | | — | Glass | 1.51 | *3 | 1.34 | — | — | 0.887 |
| | 3 | Second | $Fe_2O_3$/PMMA | 2.87 | $TiO_2$/PEs | 1.80 | — | | — | High Refractive Glass | 2.58 | Air | 1.00 | — | — | 0.388 |
| | 4 | Second | $TiO_2$ | 2.76 | PEs | 1.60 | — | | — | $Fe_2O_3$/PMMA | 2.91 | *3 | 1.34 | — | — | 0.460 |
| Comp. | 1 | — | PSt/BA/MAA | 1.56 | *1 | 1.41 | — | | — | — | | — | — | — | — | — |
| | 2 | First | $SiO_2$ | 1.45 | PVA | 1.51 | Glass | 1.51 | — | | — | | — | 1.041 | 1.000 | — |
| | 3 | First | PSt/BA/MAA | 1.56 | $TiO_2$/PEs | 1.41 | PEs | 1.80 | — | | — | | — | 1.026 | 1.277 | — |
| | 4 | Second | $Fe_2O_3$/PMMA | 2.87 | PEs | 1.80 | — | | — | $As_2Se_3$/PMMA | 3.13 | Air | 1.00 | — | — | 0.319 |

**: Example, Comp.: Comparative Example,
*1: Silicone Gel,
*2: Fluorinated Gel
*3: Fluorinated Resin

TABLE 2

| | | Evaluation Result Viewing Angle |
|---|---|---|
| Example | 1 | 0-52° C. |
| | 2 | 0-38° C. |
| | 3 | 0-21° C. |
| | 4 | 0-26° C. |
| Comparative Example | 1 | 0-90° C. |
| | 2 | 0-90° C. |
| | 3 | 0-90° C. |
| | 4 | 0-16° C. |

The display member of the present invention can be used for a display having a high level of security.

What is claimed is:

1. A display member comprising:
a display layer which exhibits a structural color and contains therein spherical bodies and a matrix; and
a reflective interface which reflects a light transmitted through the display layer,
wherein the reflective interface is made between the display layer and a reflective interface forming layer which is provided in contact with the display layer;
a refractive index, na, of the spherical bodies, a refractive index, nb, of the matrix, and a refractive index, nc, of the reflective interface forming layer satisfy the following Formulas (1) and (2):

$0.35 < nc/na < 1.00$ \hfill Formula (1)

$0.35 < nc/nb < 1.00$; and \hfill Formula (2)

the spherical bodies are regularly arranged in a periodic structure both in a plane direction and in a depth direction of the display layer.

2. The display member of claim 1,
wherein an absolute value of a difference between a refractive index of the spherical bodies and that of the matrix is from 0.02 to 2.0.

3. The display member of claim 1,
wherein the display layer has a thickness of 0.1 to 100 μm.

4. The display member of claim 1,
wherein the display layer contains a spherical body layer having a thickness of 0.1 to 100 μm.

5. The display member of claim 4,
wherein the spherical body layer has a repeating number of 5 to 500.

6. The display member of claim 5,
wherein a particle layer distance in the display layer is from 50 to 500 nm.

7. The display member of claim 1,
wherein the spherical bodies are arranged in a state of contact with each other.

8. A display member comprising:
a display layer which exhibits a structural color and contains therein spherical bodies and a matrix; and
a reflective interface which reflects a light transmitted through the display layer,
wherein the reflective interface is made between a reflective interface forming upper layer and a reflective interface forming under layer, provided that the reflective interface forming upper layer is located in a position nearer to the display layer than the reflective interface forming under layer, and the under layer is provided in contact with the upper layer; and
a refractive index, nb, of the matrix, a refractive index, nc1, of the reflective interface forming upper layers and a refractive index, nc2, of the reflective interface forming under layer satisfy the following Formulas (3) and (4):

$nb \leq nc1$ \hfill Formula (3)

$0.35 < nc2/nc1 < 1.00$; and \hfill Formula (4)

the spherical bodies are regularly arranged in a periodic structure both in a plane direction and in a depth direction of the display layer.

9. The display member of claim 8,
wherein an absolute value of a difference between a refractive index of the spherical bodies and that of the matrix is from 0.02 to 2.0.

10. The display member of claim 8,
wherein the display layer has a thickness of 0.1 to 100 μm.

11. The display member of claim 8,
wherein the display layer contains a spherical body layer having a thickness of 0.1 to 100 μm.

12. The display member of claim 11,
wherein the spherical body layer has a repeating number of 5 to 500.

13. The display member of claim 12,
wherein a particle layer distance in the display layer is from 50 to 500 nm.

* * * * *